United States Patent [19]

Panzer et al.

[11] 4,217,443

[45] Aug. 12, 1980

[54] WATER-SOLUBLE CROSSLINKED POLYSULFONIUM COMPOUNDS AND PROCESS THEREFOR

[75] Inventors: Hans P. Panzer, Stamford; Anthony T. Coscia, Norwalk; Albert G. Robustelli, Darien, all of Conn.

[73] Assignee: American Cyanamid Company, Stamford, Conn.

[21] Appl. No.: 4,642

[22] Filed: Jan. 19, 1979

[51] Int. Cl.$^2$ .................................... C08G 75/00
[52] U.S. Cl. .................................... 528/373; 210/54; 528/374
[58] Field of Search ........................ 528/373, 374

[56] References Cited

U.S. PATENT DOCUMENTS 2,518,245  8/1950  Morris et al. .................. 528/373

Primary Examiner—Melvyn I. Marquis
Attorney, Agent, or Firm—William J. vanLoo; Paul W. Leuzzi, II

[57] ABSTRACT

Water-soluble cross-linked polysulfonium derivatives of poly(thiodiethanol) ethers are provided by reacting the ethers with difunctional sulfide-reactive alkylating agents.

8 Claims, No Drawings

WATER-SOLUBLE CROSSLINKED POLYSULFONIUM COMPOUNDS AND PROCESS THEREFOR

CROSS-REFERENCE TO RELATED APPLICATION

This application is related to copending application Ser. No. 4,641 filed on Jan. 19, 1979. The present application relates to polymers and preparative process therefor, the copending application relates to use thereof in flocculation applications.

This invention relates to novel cationic polymers and to a process for the preparation thereof. More particularly this invention relates to poly(thiodiethanol) ethers which are chemically modified by a difunctional alkylating agent to provide crosslinked but water-soluble cationic poly(sulfoniumdiethanol)ether salts.

Cationic polymers that are water-soluble are useful in a variety of applications in which their cationicity is advantageously. Many of these cationic polymers obtain their cationicity by virtue of a nitrogen atom in the polymer molecule, the strongest charge being exhibited by quaternary ammonium groups in the nitrogen series. These cationic polymers are effective flocculants for suspended particles and are used in applications involving river water clarification and settling of solids in municipal and industrial wastes, iron ore slimes, fine coal slurries, enzyme mashes, and the like.

Many of the applications of cationic flocculants involve suspensions that are chlorinated. The chlorine present in these chlorinated suspensions adversely affects the performance of amine polymers that are degraded by chlorine rendering them ineffective in the use contemplated. Cationic polymers that are effective flocculants in applications involving chlorine are limited in number and are generally difficult and expensive to provide. In addition, suitable amines for preparing cationic polymers are becoming short in supply with a resulting increase in cost. Consequently, there is need for cationic flocculants that are effective in the presence of chlorine and are readily prepared from readily available economic starting materials. The provision for such cationic polymers would satisfy a long-felt need and constitute a significant advance in the art.

In accordance with the present invention there is provided a water-soluble cationic polymer containing repeating units of the structure:

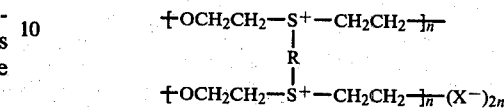

as the cationic portion wherein R is the radical derived from a difunctional sulfide-reactive alkylating agent and n is a value such that the molecular weight of the repeating units does not exceed about 30,000, and 2X⁻ as the anionic portion wherein X represents an anion neutralizing a cationic charge of the polymer and providing a water-soluble polymer.

In accordance with the present invention there is provided a process for preparing a water-soluble cross-linked cationic polymer which comprises reacting a polymer containing repeating units of the structure:

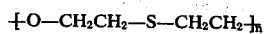

wherein n is a value such that the molecular weight of the repeating units does not exceed about 30,000 with a sufficient quantity of a sulfide-reactive difunctional alkylating agent in the presence of an aqueous reaction medium to provide a water-soluble cross-linked cationic polymer containing repeating units of the structure:

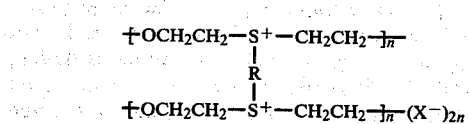

as the cationic portion wherein R is the radical derived from said alkylating agent and n has the significance previously given and 2X⁻ as the anionic portion wherein X represents an anion neutralizing a cationic charge of the polymer and providing a water-soluble polymer.

The polymers of the present invention are water-soluble and effective flocculants in applications involving chlorine as well as in applications wherein chlorine is not involved. The polymers are free of amine cationicity and thus offer effective alternatives to amine usage.

The polymers of the present invention are readily prepared by suitable chemical modification of poly(thiodiethanol)ethers and are based on economic starting materials. Thiodiethanol is prepared by reaction of hydrogen sulfide and ethylene oxide. Poly(thiodiethanol)ethers may be prepared by a number of techniques including those described in U.S. Pat. No. 2,518,245 or German Patent Nos. 880,485; 959,948; 1,005,275; 1,026,072; and 1,039,232, for example.

Poly(sulfoniumdiethanol)ether salts are described in German Patent No. 1,062,014. These polymers, however, are not cross-linked and are made by reaction of a monofunctional alkylating agent with the sulfide linkage of the repeating thiodiethanol unit. These products are not described as flocculating agents but are used as dye assistants or as surface active agents.

In preparing the polysulfonium compounds of the present invention, a poly(thiodiethanol)ether is reacted with a suitable quantity of a sulfide-reactive difunctional alkylating agent to provide a cross-linked polymer containing sulfonium linkages at the points of cross-linking, the extent of cross-linking being such that the resulting polymer retains its water-solubility. As indicated, the instant polymers derive their cationicity from sulfonium ions and are highly effective flocculants. Suitable sulfur-reactive difunctional alkylating agents include, for example, 1,4-dichloro-2-butene, epichlorohydrin, ethylene dichloride, epibromohydrin, and the like as well as mixtures thereof.

Suitable poly(thiodiethanol)ethers are those prepared by heating thiodiethanol in the presence of a suitable etherification catalyst, such as phosphoric acids or derivatives thereof. Additional molecular weight buildups may be achieved by reacting with a difunctional extending agent such as phosgene.

To prepare the cross-linked water-soluble polysulfonium derivatives of the poly(thiodiethanol) ethers, the sulfide reactive difunctional alkylating agent and ether are contacted under reactive conditions. Contact may be effected in aqueous suspension, in organic solvents, or in the melt at moderately elevated temperatures, for example 30°–100° C. The reaction mixture may be buffered with sodium bicarbonate, sodium carbonate, sodium hydroxide solution or other suitable bases to facilitate reaction. It is generally preferred to carry out the reaction with a polymer melt and alkylating agent dispersed therein while incrementally infusing water into the reaction mixture to dissolve the desired reaction product as it forms.

In preparing the cross-linked water-soluble polysulfonium derivatives of the poly(thiodiethanol)ethers, it is necessary to employ as starting materials poly(thiodiethanol)ethers having molecular weight values below about 20,000. Higher molecular weight values lead to gelled and water-insoluble polymers. Even within the molecular weight range indicated, water-insoluble or poor performing polymers will result if preparation conditions are not properly controlled. Generally, best performance is obtained when preparation is conducted at 40°–60° C. With epichlorohydrin, polymer solids of about 20–30% with incremental addition of water to provide this content appears to offer best performance. With the dihalide alkylating agents, best performance appears to occur at polymer solids of 10% and water-soluble polymers are not obtained at molecular weight values of the polythiodiethanol ethers of 30,000. With epichlorohydrin, although water-soluble polymers are obtained at molecular weights of 30,000, the polymers resulting are poor in performance.

The invention is more fully illustrated in the examples which follow wherein all parts and percentages are by weight unless otherwise specified.

EXAMPLE 1

Into a 100 milliliter round bottom reaction flask equipped with condenser, stirrer, and thermometer were placed 10 grams (0.0961 mole) of a poly(thiodiethanol)ether of molecular weight 4,000. The flask was immersed in an oil bath maintained at 50° C. and the polymer melted in 5 minutes. With stirring 10.8 grams (0.1167 mole) of epichlorohydrin were added. The mixture was stirred at 50° C. until uniform (about 5 minutes). Water was added using an infusion pump until a solids content of 25% was obtained, about 6.5 hours. The resulting polysulfonium derivative has an intrinsic viscosity in aqueous 1 molar NaCl at 25° C. of 0.08 and a charge density of greater than 60%. The solution pH was 7.5–8.0.

EXAMPLE 2

Using the procedure described in Example 1, 5.0 grams (0.048 mole) of the same polymer was placed in the flask. After melting the polymer, 3.0 grams (0.024 mole) of 1,4-dichloro-2-butene was added. After mixing until uniform, water was added using an infusion pump over a 3-hour period until a solids content of 7.5% was obtained. After the addition of the water, the reaction was continued for an additional 4½ hours. The intrinsic viscosity was 0.16 and the cationic charge was greater than 60%. The pH of the solution was 2.5.

EXAMPLE 3

In order to assess the flocculation performance of the polysulfonium compounds prepared in Examples and and 2, tests were performed using Bentonite Simulated Raw Water (BSRW) jar tests, a conventional test procedure. In this test, the dosage of flocculant required to reduce the turbidity of the BSRW to 20% of it original value relative to that of a typical polyquaternary ammonium compound which is an important article of commerce. This polyquaternary is a high molecular weight polymer obtained by reaction of dimethylamine, epichlorohydrin and a small quantity of a polyamine and is arbitrarity assigned a relative dosage value $RD_{20}$ of 1.0. The results obtained are given in Table I which follows.

TABLE I
RELATIVE DOSAGE REQUIREMENTS FOR 20% RESIDUAL TURBIDITY

| Flocculant | $RD/_{20}$ |
|---|---|
| Polyquaternary Amine | 1.0 |
| Example 1 | 1.15 |
| Example 2 | 1.0 |

These results show that the polysulfonium compounds of the present invention are substantially equivalent in performance in water clarification to the commerical polyquaternary amine in spite of the fact that the instant polymers contain no amine groups.

COMPARATIVE EXAMPLE A

Following the procedure of Example 1, 5.0 gms. (0.048 mole) of the same poly(thiodiethanol)ether was added to the flask. There were also added an equal molar quantity of dimethyl sulfate (6.0 gms) and 25 grams of $H_2O$. The reaction was conducted for 7 hours at 21° C. The pH after reaction was 1.2 and this was adjusted to 7.0 using dilute aqueous NaOH.

COMPARATIVE EXAMPLE B

The polysulfonium compound of Comparative Example A, which was not a cross-linked polymer, was evaluated as in Example 3. Te relative dosage $RD_{20}=10.0$. This result shows that the uncross-linked polysulfonium compounds must be used at very high dosages to equal the cross-linked polysulfonium compounds in performance.

EXAMPLES 4 AND 5

Following the procedures of Examples 1 and 3, a series of polysulfonium compounds were prepared and evaluated. In each preparation epichlorohydrin was used as the difunctional alkylating agent. Certain preparations falling outside the scope of the present invention are indicated as comparative examples. Details and results are given in Table II which follows.

EXAMPLES 6–8

Again following the procedures of Examples 1 and 3, a series of polysulfonium compounds were prepared and evaluated using 1,4-dichloro-2-butene as the difunctional alkylating agent. Certain preparations falling outside the scope of the present invention are indicated as comparative examples. Details and results are given in Table III which follows.

TABLE II
POLYSULFONIUM DERIVATIVES OBTAINED WITH EPICHLOROHYDRIN (EPI)

| Example No. | Poly(Thiodiethanol)Ether Mol. Weight | Mole | EPI Mole | Reaction Cycle | | Solids (%) | $RD_{20}$ |
|---|---|---|---|---|---|---|---|
| 4 | 4,000 | 1.0 | 1.0 | 7 hours | 50° C. | 25 | 1.2 |
| 5 | 4,000 | 1.0 | 1.0 | 16 hours | 40° C. | 25 | 2.2 |
| Comp. C | 11,000 | 1.0 | 1.0 | 6 hours | 50° C. | 20 | 3.2 |
| Comp. D | 30,000 | 1.0 | 1.0 | 8 hours | 50° C. | 30 | gel |

TABLE II-continued
POLYSULFONIUM DERIVATIVES OBTAINED WITH EPICHLOROHYDRIN (EPI)

| Example No. | Poly(Thiodiethanol)Ether Mol. Weight | Mole | EPI Mole | Reaction Cycle | | Solids (%) | $RD_{20}$ |
|---|---|---|---|---|---|---|---|
| E | 30,000 | 1.0 | 1.0 | 3 hours | 60° C. | 10 | 3.65 |

Table III
POLYSULFONIUM DERIVATIVES OBTAINED WITH 1,4-DICHLORO-2-BUTENE DCB

| Example No. | Poly(Thiodiethanol)Ether Mol. Weight | Mole | | Reaction Cycle | | Solids (%) | $RD_{20}$ |
|---|---|---|---|---|---|---|---|
| 6 | 4,000 | 2.0 | 1.0 | 7 hours | 50° C. | 10 | 1.1 |
| 7 | 11,000 | 2.0 | 1.0 | 3 hours | 70° C. | 5 | 1.3 |
| 8 | 11,000 | 2.0 | 1.0 | 7 hours | 50° C. | 5 | 1.2 |
| Comp. F | 30,000 | 2.0 | 1.0 | 5 hours | 50° C. | 10 | gel |
| Comp. G | 30,000 | 2.0 | 1.0 | 3 hours | 60° C. | 10 | gel |

We claim:

1. A water-soluble cross-linked cationic polymer containing repeating units of the structure:

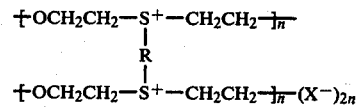

wherein R is the radical derived from a difunctional sulfide-reactive alkylating agent and n is a value such that the molecular weight of the repeating units does not exceed about 30,000 and where X represents an anion neutralizing a cationic charge of the polymer and providing a water-soluble polymer.

2. The water-soluble cross-linked cationic polymer of claim 1 wherein said R is the radical derived from 1,4-dichloro-2-butene.

3. The water-soluble cross-linked cationic polymer of claim 1 wherein said R is the radical derived from epichlorohydrin.

4. The water-soluble cross-linked cationic polymer of claim 1 containing at least about 60% of said repeating units.

5. A process for preparing a water-soluble cross-linked cationic polymer which comprises reacting a polymer containing repeating units of the structure —$OCH_2CH_2$—S—$CH_2CH_2$— with a sufficient quantity of a sulfide-reactive difunctional alkylating agent in the presence of an aqueous reaction medium to provide a water-soluble cross-linked cationic polymer containing repeating units of the structure

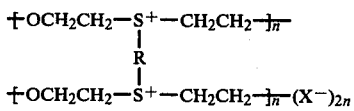

as the cationic portion wherein R is the radical derived from said alkylating agent and n is a value such that the molecular weight of the repeating units does not exceed about 30,000 and 2X$^-$ as the anionic portion wherein X represents an anion neutralizing a cationic charge of the polymer and providing a water-soluble polymer.

6. The process of claim 5 wherein said alkylating agent is 1,2-dichloro-2-butene.

7. The process of claim 5 wherein said alkylating agent is epichlorohydrin.

8. The process of claim 5 wherein the amount of said alkylating agent provides at least about 60% of repeating cationic units.

* * * * *